(12) United States Patent
Guay

(10) Patent No.: US 8,662,800 B2
(45) Date of Patent: Mar. 4, 2014

(54) CUTTING HEAD WITH COOLANT CHANNEL

(75) Inventor: Patrice Guay, Newmarket (CA)

(73) Assignee: Sandvik Intellectual Property AB, Sandviken (SE)

( * ) Notice: Subject to any disclaimer, the term of this patent is extended or adjusted under 35 U.S.C. 154(b) by 13 days.

(21) Appl. No.: 13/444,008

(22) Filed: Apr. 11, 2012

(65) Prior Publication Data

US 2013/0272806 A1    Oct. 17, 2013

(51) Int. Cl.
  *B23B 51/06*    (2006.01)

(52) U.S. Cl.
  USPC ............... 408/57; 407/11; 409/234; 279/8

(58) Field of Classification Search
  USPC ............ 408/57, 59, 231, 233, 238, 239 R; 407/11; 409/234; 279/8
  See application file for complete search history.

(56) References Cited

U.S. PATENT DOCUMENTS

| | | | | |
|---|---|---|---|---|
| 941,568 A | * | 11/1909 | Fleming | 7/158 |
| 1,384,733 A | * | 7/1921 | Woods | 408/56 |
| 3,947,143 A | * | 3/1976 | Gulla | 408/230 |
| 4,274,771 A | * | 6/1981 | Nishimura | 408/230 |
| 5,378,091 A | * | 1/1995 | Nakamura | 409/132 |
| 5,701,578 A | * | 12/1997 | Liu | 428/565 |
| 5,851,094 A | | 12/1998 | Strand et al. | |
| 5,865,574 A | * | 2/1999 | Tukala | 408/57 |
| 6,045,301 A | * | 4/2000 | Kammermeier et al. | 408/57 |
| 6,394,711 B1 | * | 5/2002 | Brosius | 408/57 |
| 6,902,355 B2 | * | 6/2005 | Kress et al. | 408/59 |
| 7,300,233 B2 | * | 11/2007 | Haenle et al. | 408/57 |
| 7,611,311 B2 | | 11/2009 | Kakai et al. | |
| 8,087,854 B2 | * | 1/2012 | Kleiner | 408/57 |
| 2005/0232710 A1 | | 10/2005 | Schafer et al. | |
| 2009/0142150 A1 | * | 6/2009 | Chu | 408/59 |

FOREIGN PATENT DOCUMENTS

| | | | |
|---|---|---|---|
| DE | 10347755 A1 | * | 7/2004 |
| DE | 10 2009 034 202 | | 9/2010 |
| DE | 102009034202 B3 | * | 9/2010 |
| EP | 1 462 197 | | 9/2004 |
| EP | 1 506 069 | | 2/2005 |
| JP | 03149114 A | * | 6/1991 |
| JP | 04159009 A | * | 6/1992 |
| JP | 2003285214 A | * | 10/2003 |
| JP | 2003326412 A | * | 11/2003 |
| JP | 2005169590 A | * | 6/2005 |
| WO | WO 2008044115 A1 | * | 4/2008 |
| WO | 2010/102793 | | 9/2010 |
| WO | 2011/006804 | | 1/2011 |

* cited by examiner

*Primary Examiner* — Andrea Wellington
*Assistant Examiner* — Nicole N Ramos
(74) *Attorney, Agent, or Firm* — Morgan, Lewis & Bockius LLP

(57) ABSTRACT

A rotational tool includes a cutting head and a basic body. The cutting head includes a cutting portion including a chip flute and at least one of a cutting edge and an insert seat, where the chip flute is located before the at least one of the cutting edge and the insert seat in a rotational direction of the cutting head. A coupling portion is located axially rearward of the cutting portion relative to a cutting end of the cutting head, and is configured to couple to the basic body. A coolant slot extends axially and opens at an external radial surface of at least a portion of the cutting head.

26 Claims, 8 Drawing Sheets

CUTTING HEAD WITH COOLANT CHANNEL

FIELD OF THE DISCLOSURE

The present disclosure relates to a cutting head of a tool for rotary chip removal, milling or cutting machining. More specifically, the present disclosure relates to an exchangeable cutting head that provides a path for coolant to flow to the area of machining, as well as a tool incorporating the cutting head and a method of forming the cutting head.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Related rotatable cutting tools include two parts connected via an interface or joint. For example, as shown in U.S. Pat. No. 7,611,311, a basic body and a cutting head are detachably connected together via a threaded joint. The threaded joint may be part of a coupling portion of the cutting head and may be used to couple (i.e., detachably connect) the basic body and the cutting head.

In order to increase cutting tool life, it is known to provide coolant to cutting heads. Such coolant may be provided from the basic body to the cutting head via, for example, internal channels such as a central coolant channel. See, for example, DE 10 2009 034 202 B3. However, related art coolant-providing mechanisms, such as internal channels, have the disadvantage of complicated production.

SUMMARY

A cutting head is provided that includes a cutting portion having a chip flute and at least one of a cutting edge and an insert seat; a coupling portion that is located axially rearward of the cutting portion relative to a cutting end of the cutting head; and a coolant slot that extends axially in the coupling portion and opens at an external radial periphery of at least a portion of the cutting head.

Additionally, a milling tool is provided that includes a basic body and a cutting head coupled to the basic body, the cutting head including a cutting portion having at least one of a cutting edge and an insert seat; a coupling portion located axially rearward of the cutting portion relative to a cutting end of the cutting head, the coupling portion being configured to couple to the basic body; and a coolant slot extending axially in the coupling portion and opening at an external radial periphery of the cutting head, wherein, when the coupling portion of the cutting head is coupled to the basic body, the coolant slot is closed radially and forms a cavity.

Also, a method of forming a cutting head is provided that includes steps of forming a cutting portion having a chip flute and at least one of a cutting edge and an insert seat; forming a coupling portion located axially rearward of the cutting portion relative to a cutting end of the cutting head; and forming a coolant slot extending axially in the coupling portion and opening at an external radial periphery of the cutting head.

BRIEF DESCRIPTION OF THE DRAWING

The following detailed description of preferred embodiments can be read in connection with the accompanying drawings in which like numerals designate like elements and in which.

DETAILED DESCRIPTION

Figure 1:
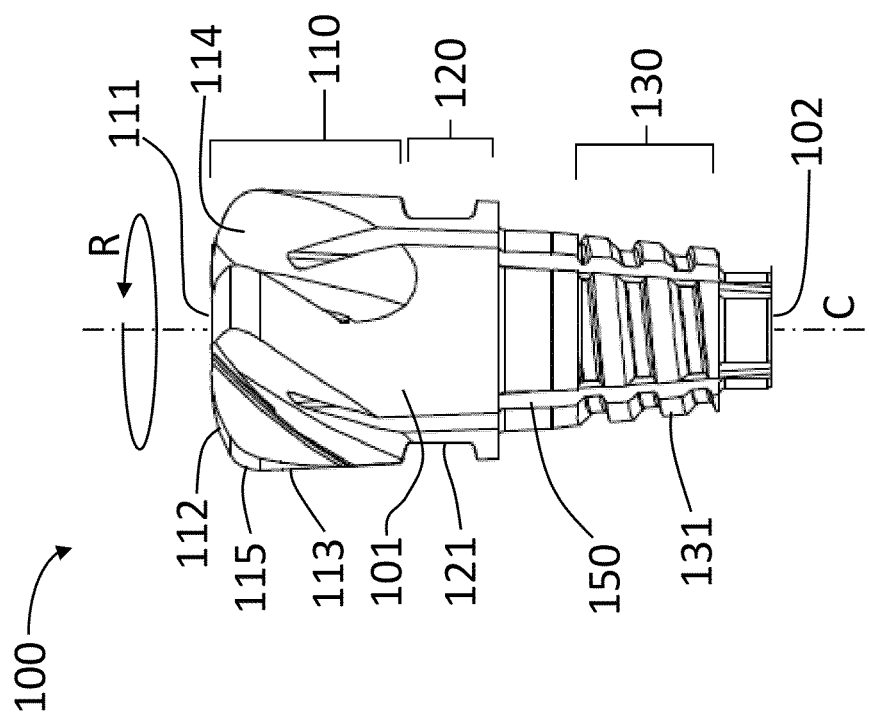
FIG. 1 shows a side view of a cutting head.

FIG. 1 shows an exchangeable cutting head 100 of a rotatable cutting tool. In an exemplary embodiment, the cutting head 100 may be a modified CoroMill® 316 cutting head or a similar cutting head, and may include a cutting portion 110, an intermediate portion 120, and a coupling portion 130. The cutting head 100 may be designed to rotate in a rotational direction R around a center axis C.

A cutting end 111 of the cutting head 100 is included in cutting portion 110. As shown in FIG. 1, this cutting end 111 may be a terminal end of the cutting head 100. The cutting head 100 may include a front cutting edge 112 and/or a side cutting edge 113. The front cutting edge 112 and/or side cutting edge 113 may be located in or proximate to a chip flute 114. In one embodiment, the front cutting edge 112 is located at the cutting end 111. Further, the front cutting edge 112 may be connected to the side cutting edge 113 via a further cutting portion 115, which may be suitable curved, singly or multiply (i.e., with one or more radius of curvature), or made up of a series of planar surfaces, to connect the front cutting edge 112 with the side cutting edge 113. Additionally and/or alternatively, in an embodiment such as that shown in FIG. 6, the cutting head 100 may include a seat 171, the seat 171 being configured to receive a cutting insert 172. This seat 171 may be located in or proximate to the chip flute 114.

Referring back to FIG. 1, the cutting portion 110 may include an envelope surface 101 that defines an outer periphery of the cutting portion 110. The envelope surface 101 may be rotationally symmetrical.

The chip flute 114 may include a surface that extends helically around the center axis C. The side cutting edge 113 may also extend in a helicoidal manner around the center axis C, and each of the front cutting edge 112, the cutting portion 115, and the side cutting edge 113 may define terminal ends of the surface of chip flute 114. The surface of the chip flute 114 may be smooth or may incorporate structure such as ridges, valleys or other geometric features designed to assist with the removal of chips from the area of machining when the cutting head is in use. In one exemplary embodiment, the cutting portion 110 includes four chip flutes 114 and four of each of the front cutting edge 112, the cutting portion 115, and the side cutting edge 113. In another embodiment, the cutting portion 110 includes three chip flutes 114 and three of each of the front cutting edge 112, the cutting portion 115, and the side cutting edge 113. In yet another embodiment, the cutting portion 110 includes two chip flutes 114 and two of each of the front cutting edge 112, the cutting portion 115, and the side cutting edge 113.

An intermediate portion 120 of the cutting head 100 may be spaced between the cutting portion 110 and the coupling portion 130. The intermediate portion 120 may include part of the envelope surface 101, as the envelope surface 101 extends from the intermediate portion 120 to the cutting portion 110 discussed above. Further, the intermediate portion 120 may include one or more wrench flats 121. The wrench flat 121 may be used to apply force to the cutting head 100 to decouple the cutting head 100 from the basic body 200 of the rotatable cutting tool when the cutting head 100 and the basic body 200 are coupled. In an exemplary embodiment, there are two wrench flats 121, the wrench flats 121 being spaced 180 degrees from each other when viewed in an axial direction of the cutting head 100. Alternative embodiments may include any number of wrench flats 121, to mate with correlated surfaces of a wrench. As an example, the wrench flats 121 can be spaced at equal angles from each other when viewed in an axial direction of the cutting head 100.

Figure 2:
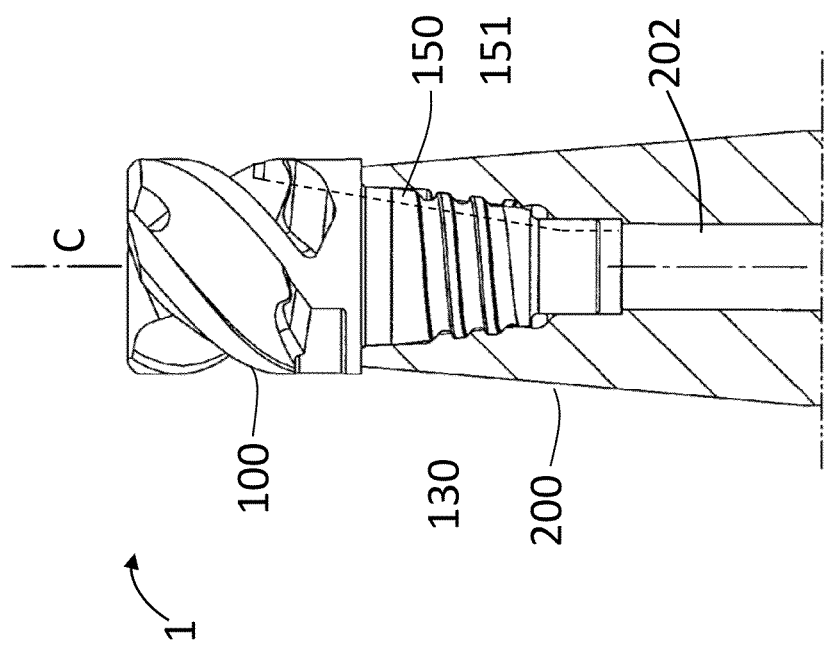
FIG. 2 shows a side view of a cutting head coupled to a cross-section of a basic body to form a milling tool.

Referring to FIG. 2, the coupling portion 130 is configured to couple with the basic body 200. In an exemplary embodiment, the coupling portion 130 couples cutting head 100 to basic body 200 in order to form the milling tool 1.

Figure 4:
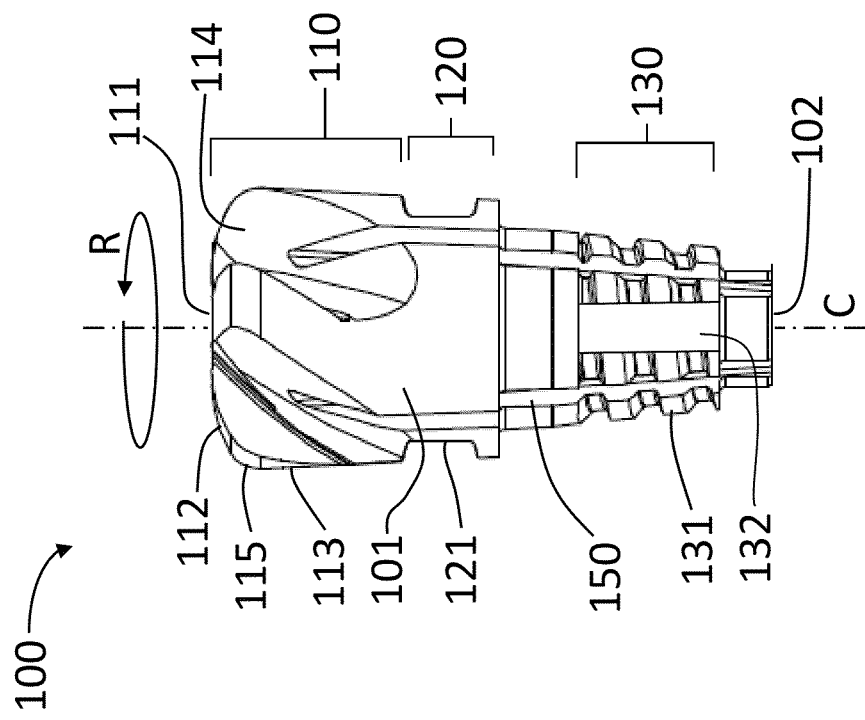
FIG. 4 shows a side view of another embodiment of a cutting head

Referring back to FIG. 1, the coupling portion 130 may be configured to couple with the basic body 200 via one or more threads 131. However, other coupling configurations are possible and are within the scope of the present embodiments. For example, the coupling portion 130 may include an interrupted thread, such as a thread 131 interrupted by a threadless surface 132 as shown in FIG. 4, or, in another example, may include a bayonet-type coupling.

The thread 131 and/or the coupling portion 130 may have any suitable shape, but a conical shape or a cylindrical shape is typical. The cutting portion 110 and intermediate portion 120 may also have this same or a different shape, and the cutting portion 110 may have a larger maximum diameter than the coupling portion 130.

The cutting head 100 includes a rearward end 102. The rearward end 102 may be considered part of or separate from the coupling portion 130. The rearward end 102 is a distal end of the cutting head 100 relative to the cutting end 111 and may be inserted into the basic body 200 when the cutting head 100 is coupled to the basic body 200.

A coolant slot 150 extends axially from at or proximate to the rearward end 102 in the coupling portion 130 and opens at an external radial periphery of the cutting head 100. In other words, in exemplary embodiments, the coolant slot 150 is a surface feature of the cutting head 100 at least along a portion of the coupling portion 130 or a combination of one or more of the cutting portion 110, the intermediate portion 120 and the coupling portion 130. In one embodiment, the slot 150 is a surface feature, i.e., open to the external surface, along its entire length from the coupling 130 portion until it intersects with the flute 114. In another embodiment, the slot 150 is a surface feature, i.e., open to the external surface, along the length of the coupling portion 130 and optionally a portion of the intermediate portion, but becomes an internal channel at least in a part of the intermediate portion 120 and/or cutting portion 130 until it intersects with the flute 114. Other combinations of surface features and internal channels for the slots are also possible.

The portion of the cutting head 100 in which the coolant slot 150 is located may be made of cemented carbide. Alternatively, the entirety of the cutting head 100 may be made of cemented carbide. In an embodiment where the portion of the cutting head 100 in which the coolant slot 150 is located is made of cemented carbide, the remainder of the cutting head 100 may be made of steel. In another embodiment, the entirety of the cutting head 100 may be made of steel.

Figure 7:
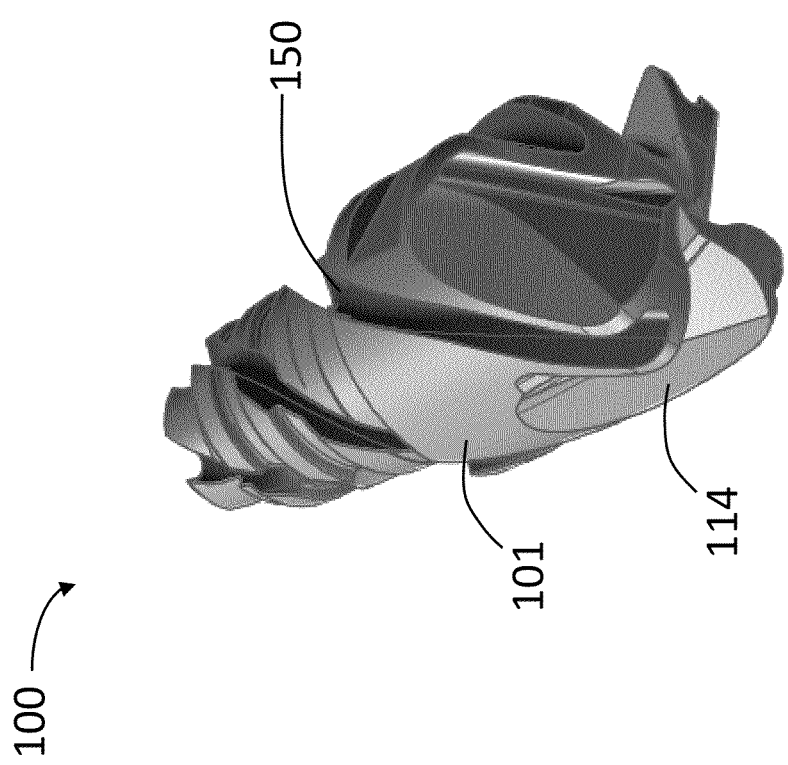
FIG. 7 shows a perspective view of an embodiment of a cutting head.

The coolant slot 150 may be straight relative to the center axis C. An example of such an embodiment is shown in FIG. 1. Alternatively, the coolant slot 150 may be helical relative to the center axis C. See, for example, the coolant slot 150 of FIG. 7. In any case, the coolant slot 150 may have a constant depth relative to the center axis C of the cutting head 100. Alternatively, the coolant slot 150 may have a constant depth relative to the external periphery of the cutting head 100 or relative to the radial position from the center axis C of the envelope surface 101.

Figure 8:
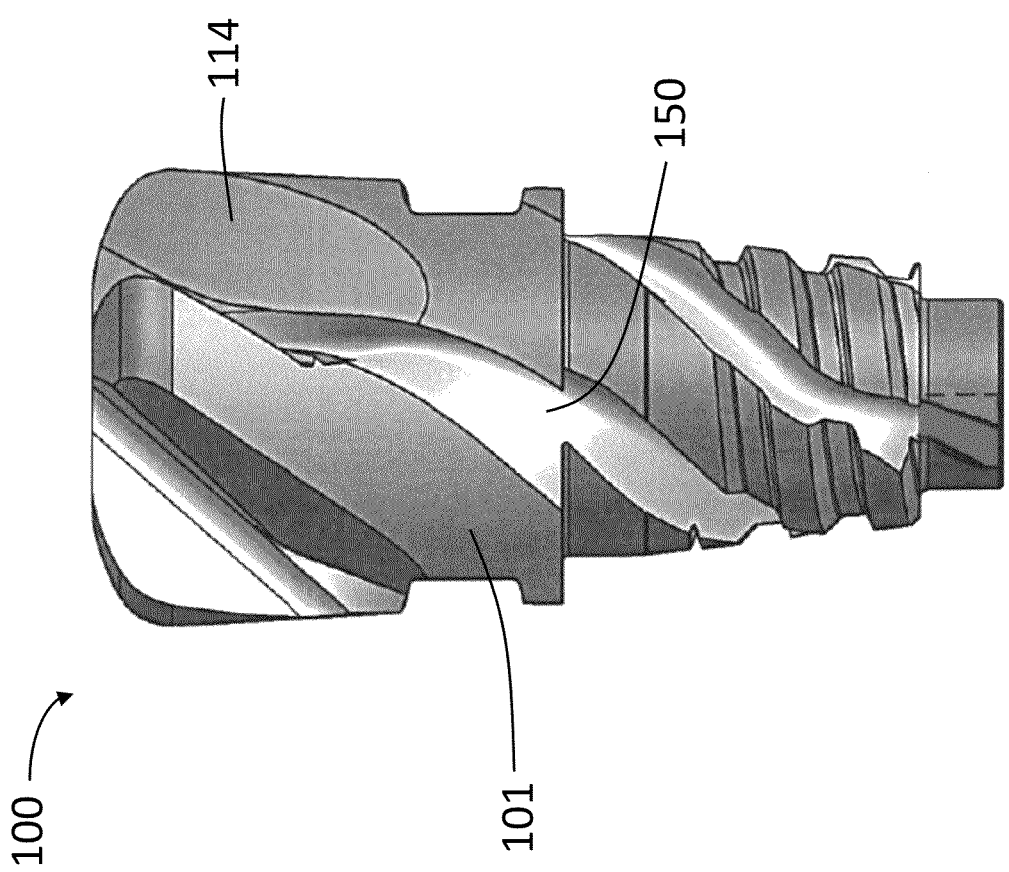
FIG. 8 shows a side view of an embodiment of a cutting head.

In an embodiment where the coolant slot 150 is helical relative to the center axis C, the coolant slot 150 may helically extend into the cutting portion 110 such that it intersects with and/or extends into a chip flute 114. See, for example, the coolant slot 150 of FIG. 8. In another embodiment where the coolant slot 150 is helical relative to the center axis C, as exemplarily shown in FIG. 7, the coolant slot 150 may helically extend into the cutting portion 110 such that it extends only in the envelope surface 101 and does not intersect with the chip flute 114.

In an exemplary embodiment, the number of coolant slots 150 is equal to the number of chip flutes 114, although the chip flutes 114 may each have varying numbers of slots, from 0 to more than 1, as space and geometry allow. Further, each chip flute 114 does not need to have the same number of slots.

Figure 5:
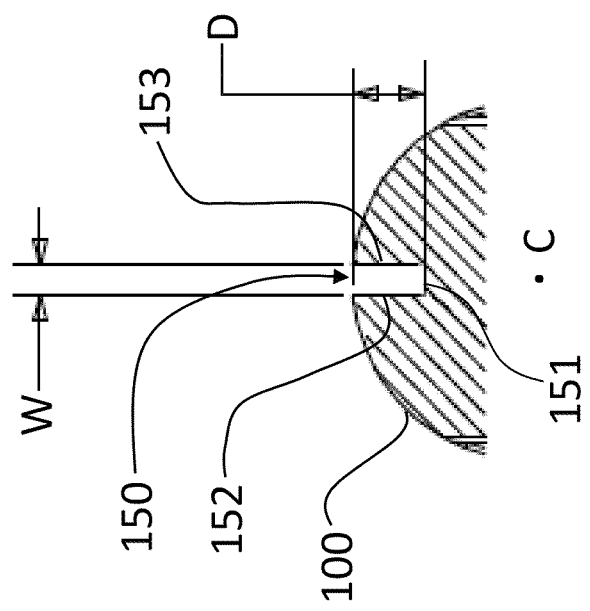
FIG. 5 shows a cross section of a cutting head when viewed in an axial direction.

As shown in FIG. 5, the coolant slot 150 may be delimited by a bottom surface 151 and two side surfaces 152 and 153. The two side surfaces 152 and 153 may extend from the bottom surface 151 to the external radial periphery of the cutting head 100, while the bottom surface 151 may be closer to the center axis C than a remainder of the external radial periphery. Thus, the coolant slot 150 may be a surface feature of the cutting head 100 such that it is externally visible. In the coupling portion 130, the exemplary coolant slot is externally visible when the cutting head 100 is not coupled to the basic body 200.

A width W of the coolant slot 150 may be defined by a distance between the two side surfaces 152 and 153 and may vary or may remain constant. In an embodiment where the cutting head 100 has an approximate diameter of 25 mm, the width W of the coolant slot 150 may be, for example, approximately 2 mm. In some embodiments, the width W of the coolant slot 150 may vary depending on the diameter of the cutting head 100. For example, a coolant slot 150 in a cutting head 100 with a diameter of 10 mm may have a smaller width W than a coolant slot 150 in a cutting head 100 with a diameter of 25 mm.

The bottom surface 151 may run parallel to the center axis C such that it has a constant depth D relative to the center axis C, or it may define an acute angle relative to the center axis C. An example of an angled depth has the bottom surface 151 angled relative to the center axis C as desired to influence coolant fluid flow through the coolant slot 150. See, for example, FIG. 2, which shows coolant slot 150, including bottom surface 151, angled relative to center axis C.

In an exemplary embodiment, the bottom surface 151 has a depth D relative to the external periphery of the cutting head 100, and in particular, an outermost portion of the threads 131 of coupling portion 110, that may be approximately 2.5 mm. In the same or another embodiment, the bottom surface 151 has a depth relative to the envelope surface 101 that may be approximately 4.75 mm. The side surfaces 152 and 153 may be at right, obtuse, or acute angles relative to the bottom surface 151 as desired to influence coolant fluid flow through the coolant slot 150. Furthermore, the bottom surface 151 and the side surfaces 152 and 153 may be continuous with each other, such that no sharp delineation between the bottom surface 151 and the side surfaces 152 and 153 exists.

The coolant slot 150 may further extend through the intermediate portion 120 to the cutting portion 110. For example, the coolant slot 150 may extend into the cutting portion 110 to a distance from the cutting end 111.

The coolant slot 150 may extend into the cutting portion 110 to intersect with the chip flute 114. In the chip flute 114, the coolant slot 150 may axially extend in a straight line to its termination, or may extend helically with the chip flute 114. In an embodiment where the cutting head includes a seat 171 for a cutting insert 172, the coolant slot 150 may extend to or proximate to the seat 171 so that coolant may be provided to the cutting surfaces of the cutting insert 172.

As discussed above, the coupling portion 130 is configured to couple with the basic body 200. When the coupling portion 130 is coupled with the basic body 200, the coolant slot 150 may be radially closed from the external environment and may instead form a cavity, as shown by the coolant slot 150 in FIG. 2. For example, the coolant slot 150 in combination with the inner diameter surface of the basic body 200 may form a closed conduit through which coolant can flow from a supply channel 202 in the basic body 200 to the terminus of the coolant slot 150. The terminus of the coolant slot 150 may be, for example, an opening in the chip flute 114 or a portion of the coolant slot 150 that is open to the external surface.

In an embodiment where there are two wrench flats 121 and two coolant slots 150, the two coolant slots 150 may be circumferentially located 90 degrees from the two wrench flats 121. In an embodiment where there are two wrench flats 121 and four coolant slots 150, each of the four coolant slots 150 may be circumferentially located 45 degrees from the nearest of the two wrench flats 121.

Figure 3:
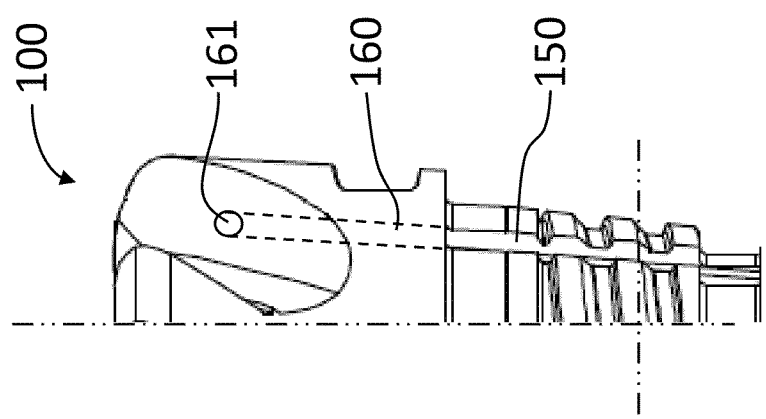
FIG. 3 shows a partial side view of another embodiment of a cutting head.

In one embodiment, the coolant slot 150 may extend through the coupling portion 130 to the intermediate portion 120, and at or near the intersection of the coupling portion 130 and the intermediate portion 120, the coolant slot may transition into an internal hole 160, as shown in FIG. 3. The internal hole 160 may extend axially from the coolant slot 150 in the coupling portion 130 to the chip flute 114, where it opens externally on the chip flute 114 via opening 161. In an embodiment that includes a seat 171 for a cutting insert 172, the internal hole 160 may extend to open at or proximate to the seat 171 in order to provide coolant to the cutting insert 172. An example of this embodiment is shown in FIG. 6.

The coolant slot 150 of the cutting head 100 may be formed by a grinding process or electrical discharging machining ("EDM"). In one embodiment, the cutting head 100 may first be formed by a powder metallurgical process, including pressing. In such an embodiment, the coolant slot 150 may be formed within a carbide blank at a pressing stage. Accordingly, a carbide blank may be created with a coolant slot 150 already formed before the carbide head is grinded to include a cutting portion 110 and a coupling portion 130. Such a process may provide economical advantages, as there may be no need for extra grinding in order to form the coolant slot 150.

Figure 6:
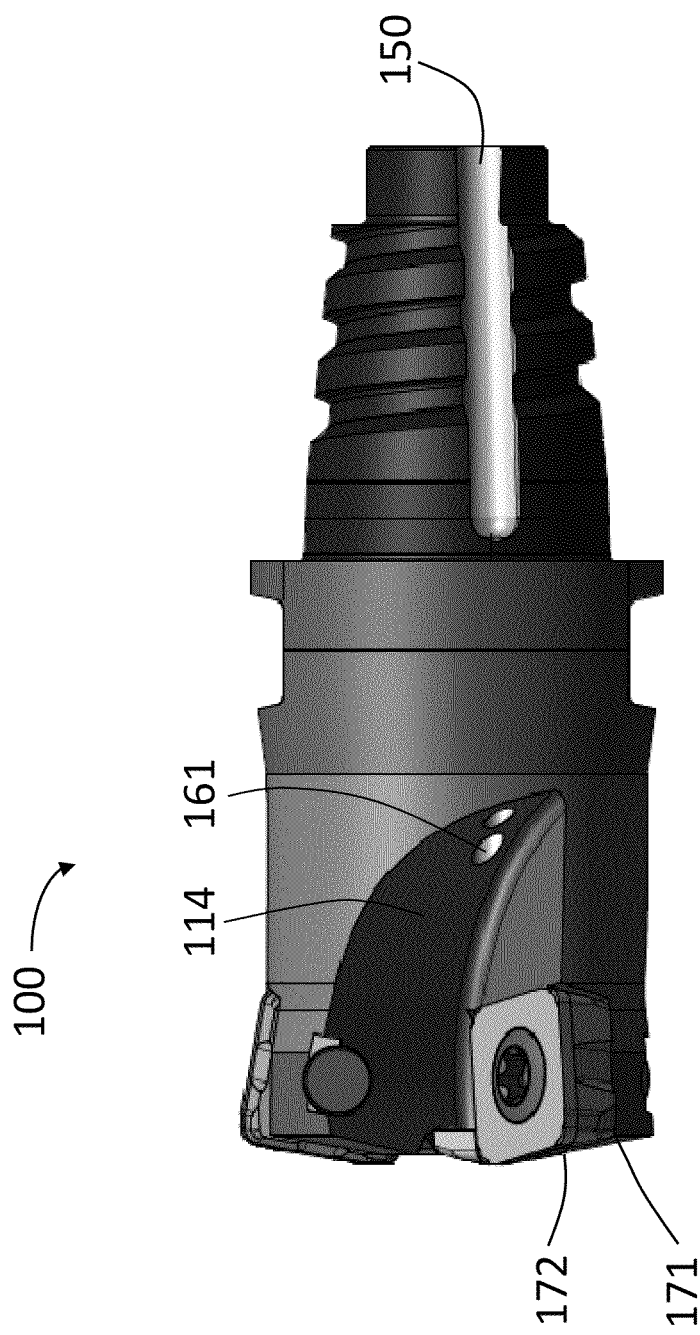
FIG. 6 shows a side view of an embodiment of a cutting head.

In another embodiment, such as for a steel cutting head 100 having an insert as shown in FIG. 6, the coolant slot 150 may be formed with a cutting tool when the cutting head 100 is machined.

The powder metallurgical process may include processes to form the internal hole 160. For a carbide cutting head 100, such as may be shown in FIG. 3, the internal hole 160 may be formed at a pressing stage of a carbide blank. For a steel cutting head 100, such as may be shown in shown in FIG. 6, the internal hole 160 may be drilled when the head is machined.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A cutting head comprising:
a cutting portion including a chip flute and at least one of a cutting edge and an insert seat;
a coupling portion located axially rearward of the cutting portion relative to a cutting end of the cutting head, wherein the coupling portion is configured to threadedly couple; and
a coolant slot extending axially in the coupling portion and opening at an external radial periphery of at least a portion of the cutting head.

2. The cutting head of claim 1, wherein the chip flute is located before the at least one of the cutting edge and the insert seat in a rotational direction of the cutting head.

3. The cutting head of claim 1, wherein the coolant slot axially extends from at or proximate to a rearward end of the cutting head, the rearward end being axially distal to the cutting end.

4. The cutting head of claim 1, wherein the coolant slot axially extends into the cutting portion to a distance from the cutting end.

5. The cutting head of claim 4, wherein the cutting head includes the insert seat, and the coolant slot extends through the cutting portion to intersect with the insert seat.

6. The cutting head of claim 3, wherein the coolant slot axially extends through the cutting portion to intersect with the chip flute and forms an opening therein.

7. The cutting head of claim 1, wherein the cutting head includes a plurality of chip flutes and a plurality of coolant slots, the number of chip flutes being equal to the number of coolant slots.

8. The cutting head of claim 1, wherein the cutting portion has a larger maximum diameter than the coupling portion.

9. The cutting head of claim 1, wherein at least the portion of the cutting head in which the coolant slot is located is made of cemented carbide.

10. The cutting head of claim 1, wherein the cutting head includes the cutting edge, and the coolant slot terminates at a distance from the cutting edge.

11. The cutting head of claim 1, wherein the coolant slot in the coupling portion is configured to be closed radially and to form a cavity when the coupling portion is coupled to a basic body of a rotational machining tool.

12. The cutting head of claim 1, further comprising:
an intermediate portion located axially between the cutting portion and the coupling portion, the intermediate portion including an internal hole in at least a portion thereof and that connects the coolant slot to an opening in the chip flute in the cutting portion.

13. The cutting head of claim 12, wherein the internal hole extends to open at a surface of the chip flute in the cutting portion.

14. The cutting head of claim 12, wherein the cutting head includes the insert seat, and the internal hole extends to or proximate to the insert seat.

15. The cutting head of claim 1, further comprising:
an intermediate portion located axially between the cutting portion and the coupling portion, wherein the coolant slot extends axially in the intermediate portion from the coupling portion to the chip flute in the cutting portion.

16. The cutting head of claim 1, wherein the coolant slot is delimited by a bottom surface and two side surfaces, the two side surfaces each extending inwardly from the external radial periphery of the cutting head to the bottom surface, the bottom surface being radially closer to a center axis of the cutting head than a remainder of the external radial periphery of the coupling portion.

17. The cutting head of claim 1, wherein the cutting head is for a rotational machining tool including the cutting head and a basic body, and the coupling portion of the cutting head is configured to couple to the basic body.

18. The cutting head of claim 1, wherein the coolant slot opens at an external radial periphery of at least a portion of the coupling portion.

19. The cutting head of claim 1, wherein the coolant slot extends helically in a surface of the chip flute to follow the contour of the surface of the chip flute.

20. A milling tool, comprising:
a basic body; and
a cutting head coupled to the basic body, the cutting head including
a cutting portion including at least one of a cutting edge and an insert seat;
a coupling portion located axially rearward of the cutting portion relative to a cutting end of the cutting head, the coupling portion being configured to couple to the basic body; and
a coolant slot extending axially in the coupling portion and opening at an external radial periphery of the cutting head;
wherein, when the coupling portion of the cutting head is coupled to the basic body, the coolant slot is closed radially and forms a cavity, and
wherein the coupling portion threadedly couples to the basic body.

21. The milling tool of claim 20, wherein the basic body includes a coolant channel, the coolant channel configured to provide coolant to the coolant slot of the cutting head.

22. A method of forming a cutting head, comprising:
forming a cutting portion including a chip flute and at least one of a cutting edge and an insert seat;
forming a coupling portion located axially rearward of the cutting portion relative to a cutting end of the cutting head, wherein the coupling portion is configured to threadedly couple; and
forming a coolant slot extending axially in the coupling portion and opening at an external radial periphery of the cutting head.

23. The method of forming a cutting head of claim 22, wherein the cutting portion and the coupling portion are formed by a powder metallurgical technique.

24. The method of forming a cutting head of claim 23, wherein the coolant slot is formed by a process that includes grinding or electrical discharging machining ("EDM").

25. The method of forming a cutting head of claim 22, wherein the cutting head is for a rotational machining tool including the cutting head and a basic body, and the coupling portion is configured to couple to the basic body.

26. The method of forming a cutting head of claim 22, wherein the coolant slot opens at an external radial periphery of at least a portion of the coupling portion.

* * * * *